United States Patent
Scheel et al.

(10) Patent No.: US 11,820,379 B2
(45) Date of Patent: Nov. 21, 2023

(54) METHOD FOR DRIVING MANEUVER ASSISTANCE OF A VEHICLE, DEVICE, COMPUTER PROGRAM, AND COMPUTER PROGRAM PRODUCT

(71) Applicant: Bayerische Motoren Werke Aktiengesellschaft, Munich (DE)

(72) Inventors: Oliver Scheel, Munich (DE); Loren Schwarz, Gruenwald (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 311 days.

(21) Appl. No.: 16/954,453

(22) PCT Filed: Mar. 14, 2019

(86) PCT No.: PCT/EP2019/056374
§ 371 (c)(1),
(2) Date: Jun. 16, 2020

(87) PCT Pub. No.: WO2019/206513
PCT Pub. Date: Oct. 31, 2019

(65) Prior Publication Data
US 2021/0086774 A1 Mar. 25, 2021

(30) Foreign Application Priority Data
Apr. 27, 2018 (DE) .................... 10 2018 206 619.1

(51) Int. Cl.
*B60W 30/18* (2012.01)
*B60W 60/00* (2020.01)
(Continued)

(52) U.S. Cl.
CPC .. *B60W 30/18163* (2013.01); *B60W 60/0011* (2020.02); *G06N 3/08* (2013.01);
(Continued)

(58) Field of Classification Search
CPC ....... B60W 30/18163; B60W 60/0011; B60W 2556/10; B60W 2050/0029; B60W 2050/0075; G06N 3/08
See application file for complete search history.

(56) References Cited

U.S. PATENT DOCUMENTS

2018/0053102 A1 2/2018 Martinson et al.
2018/0099646 A1 4/2018 Karandikar et al.
(Continued)

FOREIGN PATENT DOCUMENTS

CN 103693040 A 4/2014
CN 107531244 A 1/2018
(Continued)

OTHER PUBLICATIONS

English translation of Chinese Office Action issued in Chinese Application No. 201980006543.5 dated Dec. 15, 2021 (seven (7) pages).
(Continued)

*Primary Examiner* — Nicholas Kiswanto
*Assistant Examiner* — Jamal A Shah
(74) *Attorney, Agent, or Firm* — Crowell & Moring LLP

(57) ABSTRACT

In a method for driving maneuver assistance of a vehicle, a predefined neural network is provided, which is designed to determine whether a predefined driving maneuver is probably possible. A predefined driver model is provided, which is designed to predict a probable future behavior of a vehicle. A current driving situation of the vehicle is determined. Depending on the determined driving situation, the driver model and the neural network, it is determined whether a predefined driving maneuver is possible. Depending on the determination as to whether the driving maneuver
(Continued)

is possible, a driver assistance function for the driving maneuver is carried out and/or the driving maneuver is carried out autonomously.

16 Claims, 1 Drawing Sheet

(51) Int. Cl.
*G06N 3/08* (2023.01)
*B60W 50/00* (2006.01)

(52) U.S. Cl.
CPC ............ *B60W 2050/0029* (2013.01); *B60W 2050/0075* (2013.01); *B60W 2556/10* (2020.02)

(56) References Cited

U.S. PATENT DOCUMENTS

| | | | |
|---|---|---|---|
| 2018/0105186 A1 | 4/2018 | Motomura et al. | |
| 2018/0336423 A1* | 11/2018 | Ban | G06N 3/0445 |
| 2019/0072968 A1* | 3/2019 | Will, IV | B60W 40/02 |
| 2020/0164882 A1 | 5/2020 | Beiderbeck et al. | |

FOREIGN PATENT DOCUMENTS

| | | |
|---|---|---|
| CN | 107813820 A | 3/2018 |
| CN | 107832517 A | 3/2018 |
| DE | 10 2017 208 159 A1 | 11/2018 |
| EP | 3 272 611 A1 | 1/2018 |
| EP | 3 495 219 A1 | 6/2019 |
| KR | 10-2014-0094794 | 7/2014 |

OTHER PUBLICATIONS

International Search Report (PCT/ISA/210) issued in PCT Application No. PCT/EP2019/056374 dated Jul. 23, 2019 with English translation (seven pages).
German-language Written Opinion (PCT/ISA/237) issued in PCT Application No. PCT/EP2019/056374 dated Jul. 23, 2019 (six pages).
German-language Search Report issued in German Application No. 10 2018 206 619.1 dated Feb. 20, 2019 with partial English translation (13 pages).
Hou, et al., "Situation assessment and decision making for lane change assistance using ensemble learning methods", Expert Systems with Applications, Jan. 17, 2015, pp. 3875-3882, vol. 42, No. 8, XP029221115 (eight (8) pages).
Tomar et al., "Safety of Lane Change Maneuver Through A Priori Prediction of Trajectory Using Neural Networks", Network Protocols and Algorithms, May 30, 2012, pp. 4-21, vol. 4, No. 1, XP055603982 (18 pages).

* cited by examiner

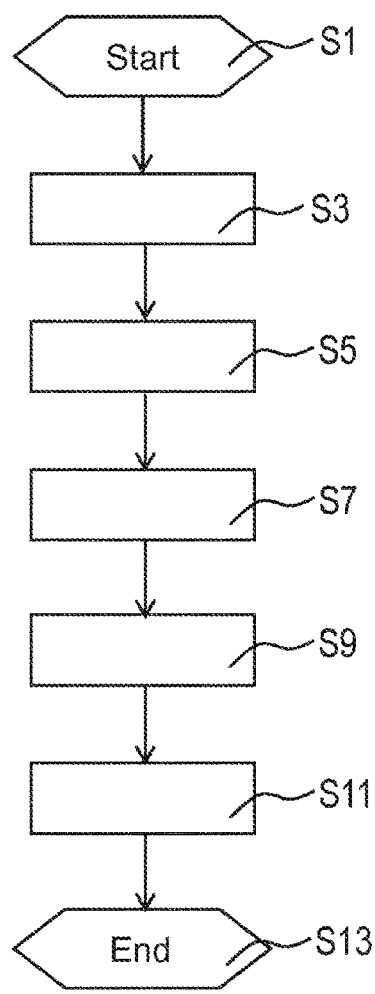

METHOD FOR DRIVING MANEUVER ASSISTANCE OF A VEHICLE, DEVICE, COMPUTER PROGRAM, AND COMPUTER PROGRAM PRODUCT

BACKGROUND AND SUMMARY OF THE INVENTION

The invention relates to a method for driving maneuver assistance of a vehicle. The invention also relates to an apparatus for driving maneuver assistance of a vehicle. The invention also relates to a computer program and to a computer program product.

Many modern vehicles have driver assistance systems which help a driver with particular driving maneuvers in an at least partially autonomous manner. So that such systems function without errors, it is particularly important to reliably analyze and assess a current driving situation and to make appropriate decisions.

The object on which the invention is based is to provide a method for driving maneuver assistance of a vehicle, which has a reliable hit accuracy.

The object is achieved by means of the features of the independent patent claims. Advantageous configurations are characterized in the subclaims.

The invention is distinguished by a method for driving maneuver assistance of a vehicle. The invention is also distinguished by an apparatus for driving maneuver assistance of a vehicle, wherein the apparatus is designed to carry out the method for driving maneuver assistance of a vehicle.

In the method for driving maneuver assistance of a vehicle, a predefined neural network is provided and is designed to determine whether a predefined driving maneuver is probably possible. A predefined driver model is provided and is designed to predict a probable future behavior of a vehicle. A current driving situation of the vehicle is determined. On the basis of the determined driving situation, the driver model and the neural network, it is determined whether a predefined driving maneuver is possible. On the basis of the determination of whether the driving maneuver is possible, a driver assistance function for the driving maneuver is carried out and/or the driving maneuver is autonomously carried out.

By determining whether a predefined driving maneuver is possible on the basis of the determined driving situation, the driver model and the neural network, a particularly reliable hit accuracy for the correct driving maneuver assistance is possible since both a current situation and a neural network are used for the determination.

Furthermore, the method can be applied to many possible driving maneuvers provided that appropriate training data for the neural network are available.

According to one optional configuration, the neural network is bidirectional.

In a bidirectional neural network, the nodes, that is to say the neurons, act both as input nodes and as output nodes. This is particularly advantageous in driving maneuver assistance since it is possible for drivers of vehicles to abort driving maneuvers and to therefore change back to an original driving situation again.

According to a further optional configuration, the neural network is recurrent, in particular bidirectional and recurrent.

A recurrent neural network additionally has feedback paths, such as direct feedback in which a neuron's own output is used as a further input, indirect feedback in which the output of a neuron is connected to a neuron in a previous layer, and/or lateral feedback in which the output of a neuron is connected to another neuron in the same layer. This is particularly advantageous in driving maneuver assistance since it is possible for drivers of vehicles to abort driving maneuvers and to therefore change back to an original driving situation again.

According to a further optional configuration, a set of driving data is provided, wherein the driving data are representative of past journeys. The neural network is trained using the set of driving data.

As a result, both past driving data and behaviors predicted by means of the driver model are transferred to the neural network, with the result that it is possible to implement very accurate training and to determine in a very reliable manner whether the driving maneuver is possible.

The set of driving data comprises, for example, recordings of a plurality of journeys on a freeway from public sources.

According to a further optional configuration, the set of driving data comprises data relating to determined driving situations of the journeys. The neural network is trained on the basis of the data relating to determined driving situations, wherein the data relating to determined driving situations comprise information relating to whether the driving maneuver can be carried out in the respective driving situation.

As a result, the neural network can be trained in a very accurate manner.

A driving situation is distinguished, for example, by one or more of the following parameters:
number of vehicles around the ego vehicle,
behavior of these other vehicles,
information relating to whether a lane, to which it is intended to change, is currently free,
information relating to whether safety distances are complied with.

According to a further optional configuration, the data relating to determined driving situations are determined by checking whether the driving maneuver was carried out following the respective driving situation.

It is possible to easily determine whether or not a driving maneuver was carried out following a respective driving situation from the set of driving data. Such an analysis can therefore be automated in a very simple manner, with the result that a large set of training data can therefore be generated for the neural network in a simple manner.

According to a further optional configuration, the data relating to determined driving situations are determined by checking whether the driving maneuver can be theoretically carried out following the respective driving situation.

The set of driving data can also be used to determine whether the driving maneuver can be theoretically carried out following the respective driving situation. This makes it possible to determine very high-quality training data for the neural network.

According to a further optional configuration, the driving maneuver is a lane change and/or an overtaking maneuver.

Lane changes and/or an overtaking maneuver, in particular, is/are carried out very frequently. However, both are very complex driving maneuvers, with the result that driver assistance or autonomous operation is advantageous, in particular, for lane changes and/or overtaking maneuvers.

According to a further aspect, the invention is distinguished by a computer program, wherein the computer program is designed to carry out the method for driving maneuver assistance of a vehicle.

According to a further aspect, the invention is distinguished by a computer program product comprising an executable program code, wherein the program code carries out the method for driving maneuver assistance of a vehicle during execution by a data processing apparatus.

The computer program product comprises, in particular, a medium which can be read by the data processing apparatus and on which the program code is stored.

Exemplary embodiments of the invention are explained in more detail below on the basis of the schematic drawing.

BRIEF DESCRIPTION OF THE DRAWING

FIG. 1 is a flowchart for driving maneuver assistance of a vehicle.

DETAILED DESCRIPTION OF THE DRAWING

FIG. 1 shows a flowchart of a program for driving maneuver assistance of a vehicle.

The program can be executed by an apparatus. The apparatus is implemented, for example, in a control apparatus of a vehicle.

The apparatus can also be referred to as an apparatus for driving maneuver assistance of a vehicle.

For this purpose, the apparatus has, in particular, a computing unit, a program and data memory and one or more communication interfaces, for example. The program and data memory and/or the computing unit and/or the communication interfaces can be formed in one structural unit and/or in a manner distributed among a plurality of structural units.

A program for driving maneuver assistance of a vehicle, in particular, is stored in the program and data memory of the apparatus for this purpose.

The program is started in a step S1 in which variables can be initialized, if necessary.

In a step S3, a predefined neural network is provided and is designed to determine whether a predefined driving maneuver is probably possible.

In order to train the neural network, a set of driving data is provided, for example, wherein the driving data are representative of past journeys. The network is then trained using the set of driving data.

The set of driving data comprises, for example, data relating to determined driving situations of the journeys. The neural network is trained, for example, on the basis of the data relating to determined driving situations, wherein the data relating to determined driving situations comprise information relating to whether the driving maneuver can be carried out in the respective driving situation.

The data relating to determined driving situations are determined, for example, by checking whether the driving maneuver was carried out following the respective driving situation.

Alternatively or additionally, the data relating to determined driving situations are determined by checking whether the driving maneuver can be theoretically carried out following the respective driving situation.

The neural network is bidirectional and/or recurrent, for example.

In a step S5, a predefined driver model is provided and is designed to predict a probable future behavior of a vehicle.

In a step S7, a current driving situation of the vehicle is determined.

For this purpose, data from a plurality of sensors are evaluated, for example. A driving situation is distinguished, for example, by one or more of the following parameters:
current lane and/or speed of the ego vehicle,
number (and position) of vehicles around the ego vehicle,
behavior (current speeds and/or current accelerations and/or current lane changes) of these other vehicles,
information relating to whether a lane, to which it is intended to change, is currently free,
information relating to whether safety distances are complied with,
information relating to a future course of the route.

In a step S9, it is determined whether a predefined driving maneuver is possible on the basis of the determined driving situation, the driver model and the neural network.

In a step S11, a driver assistance function for the driving maneuver is carried out and/or the driving maneuver is autonomously carried out on the basis of the determination of whether the driving maneuver is possible.

The driving maneuver is, for example, a lane change and/or an overtaking maneuver.

Finally, the program is ended in a step S13 and can be started again in step S1, if necessary.

By determining whether a predefined driving maneuver is possible on the basis of the determined driving situation, the driver model and the neural network, a particularly reliable hit accuracy for the correct driving maneuver assistance is possible since both a current situation and a neural network are used for the determination.

Furthermore, the method can be applied to many possible driving maneuvers provided that appropriate training data for the neural network are available.

What is claimed is:

1. A method for driving maneuver assistance of a vehicle, comprising: providing a predefined trained neural network designed to determine whether a predefined driving maneuver is possible; providing a predefined driver model designed to predict a probable future behavior of a vehicle, wherein the predefined driver model is different from the predefined trained neural network; determining a current driving situation of the vehicle; providing the probable future behavior of a vehicle from the predefined driver model and the current driving situation to an input of the trained neural network; processing the determined current driving situation and the probable future behavior of the vehicle from the predefined driver model in the trained neural network to determine whether the predefined driving maneuver is possible; and on the basis of the determination of whether the driving maneuver is possible, carrying out the driving maneuver in an at least partially autonomous manner and/or autonomously carrying out the driving maneuver.

2. The method according to claim 1, wherein the trained neural network is bidirectional.

3. The method according to claim 2, wherein the trained neural network is recurrent.

4. The method according to claim 1, wherein the trained neural network is recurrent.

5. The method according to claim 1, further comprising:
providing a set of driving data, wherein the driving data are representative of past journeys; and
training a neural network using the set of driving data to form the trained neural network.

6. The method according to claim 5, wherein
the set of driving data comprises data relating to determined driving situations of the journeys and the neural network is trained on the basis of the data relating to determined driving situations to form the trained neural network, and
the data relating to determined driving situations comprise information relating to whether the driving maneuver can be carried out in the respective driving situation.

7. The method according to claim 6, wherein
the data relating to determined driving situations are determined by checking whether the driving maneuver was carried out following the respective driving situation.

8. The method according to claim 7, wherein
the data relating to determined driving situations are determined by checking whether the driving maneuver can be theoretically carried out following the respective driving situation.

9. The method according to claim 6, wherein
the data relating to determined driving situations are determined by checking whether the driving maneuver can be theoretically carried out following the respective driving situation.

10. The method according to claim 1, wherein the driving maneuver is a lane change or an overtaking maneuver.

11. An apparatus for driving maneuver assistance of a vehicle, comprising: a computer and associated peripherals configured to: provide a predefined trained neural network designed to determine whether a predefined driving maneuver is possible; provide a predefined driver model designed to predict a probable future behavior of a vehicle, wherein the predefined driver model is different from the predefined trained neural network; determine a current driving situation of the vehicle; provide the probable future behavior of a vehicle from the predefined driver model and the current driving situation to an input of the trained neural network; process the current determined driving situation and the probable future behavior of the vehicle from the predefined driver model in the trained neural network to determine whether the predefined driving maneuver is possible; and on the basis of the determination of whether the driving maneuver is possible, carry out the driving maneuver in an at least partially autonomous manner and/or autonomously carry out the driving maneuver.

12. The apparatus according to claim 11, wherein the trained neural network is bidirectional.

13. The apparatus according to claim 12, wherein the trained neural network is recurrent.

14. A computer program product comprising a non-transitory computer readable medium having stored thereon executable program code, wherein during execution by a data processing apparatus, the program code is configured to: provide a predefined trained neural network designed to determine whether a predefined driving maneuver is possible; provide a predefined driver model designed to predict a probable future behavior of a vehicle, wherein the predefined driver model is different from the predefined trained neural network; determine a current driving situation of the vehicle; provide the probable future behavior of a vehicle from the predefined driver model and the current driving situation to an input of the trained neural network; process the current determined driving situation and the probable future behavior of the vehicle from the predefined driver model in the trained neural network to determine whether the predefined driving maneuver is possible; and on the basis of the determination of whether the driving maneuver is possible, carry out the driving maneuver in an at least partially autonomous manner and/or autonomously carry out the driving maneuver.

15. The product according to claim 14, wherein the trained neural network is bidirectional.

16. The product according to claim 15, wherein the trained neural network is recurrent.

* * * * *